Sheet 2 2 Sheets

R. Eickemeyer.
Blocking & Stretching Hats.
Nº 46553      Patented Feb. 28, 1865.

Witnesses
J. W. Coombs
G. W. Reed

Inventor
R. Eickemeyer
per Brown, Coombs & Co.
Attorney

UNITED STATES PATENT OFFICE.

RUDOLPH EICKEMEYER, OF YONKERS, NEW YORK.

IMPROVEMENT IN MACHINES FOR STRETCHING HAT-BODIES.

Specification forming part of Letters Patent No. 46,553, dated February 28, 1865.

*To all whom it may concern:*

Be it known that I, RUDOLPH EICKEMEYER, of Yonkers, in the county of Westchester and State of New York, have invented a new and Improved Machine for Stretching Hat-Bodies; and I do hereby declare that the following is a full, clear, and exact description of the same, reference being had to the accompanying drawings, forming part of this specification, in which—

Figure 1:
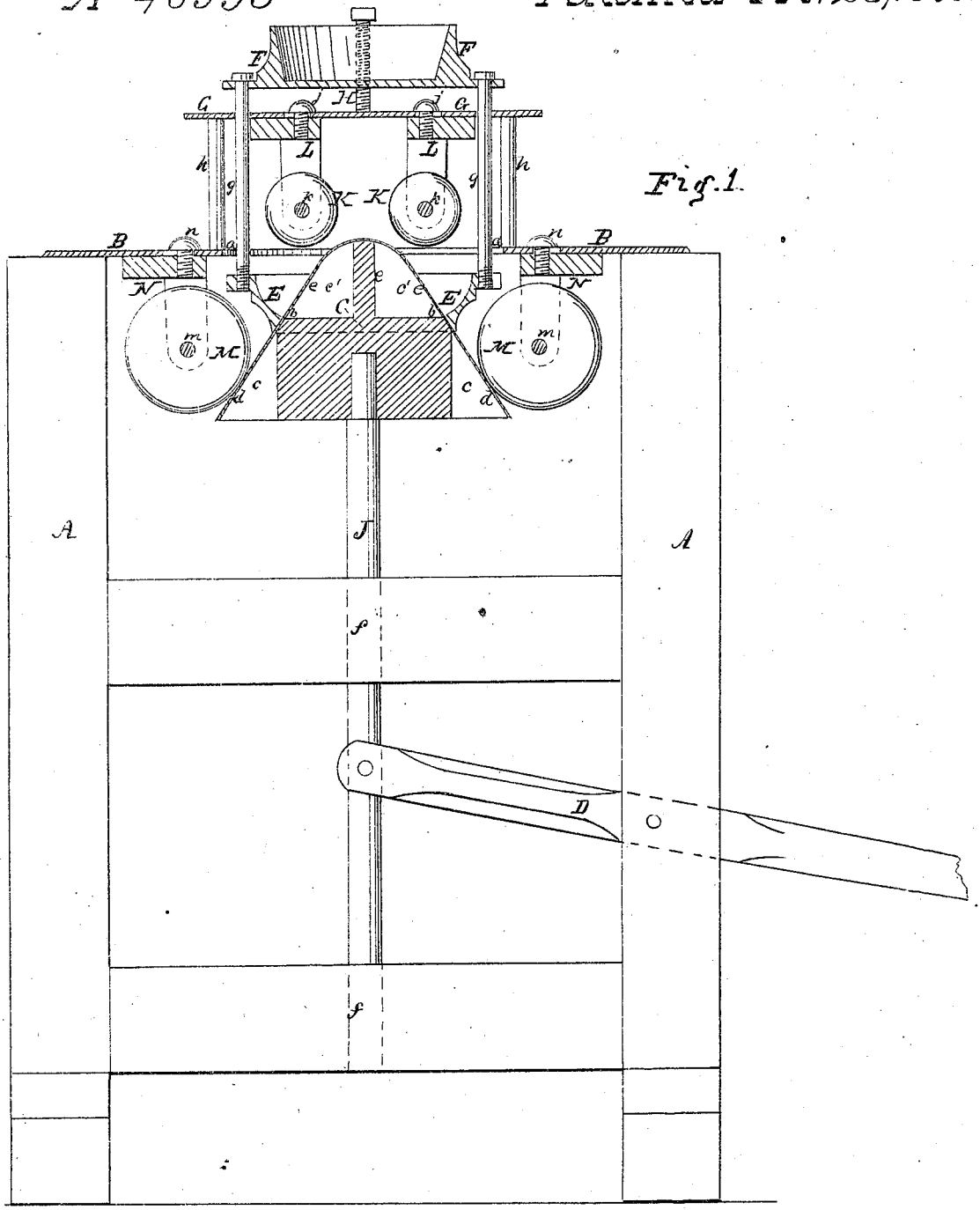
Figure 2:
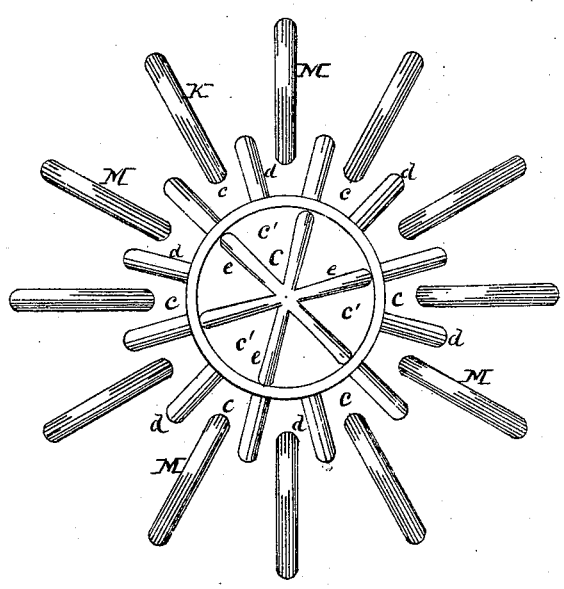
Figure 3:
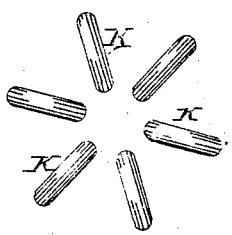

Figure 1 is a central vertical section of the machine. Fig. 2 is a plan of the skeleton former and the lower series of stretching-rollers. Fig. 3 is a plan of the skeleton former and the upper series of stretching-rollers.

Similar letters of reference indicate corresponding parts in the several figures.

In the manufacture of felt hat-bodies the body, after having been formed upon a conical former, and subjected to what is termed the "sizing" process, requires to be stretched to bring it to the required form or condition to enable the crown and brim to be produced. This stretching process has heretofore been commonly performed by hand, and requires great care and skill to bring all parts to a uniform thickness without tearing them.

The object of my invention is to perform the stretching by machinery; and to this end it consists in a machine composed of a skeleton former, an annular presser for holding the body firmly upon the said former, and two series of rollers or other stretching devices for applying pressure to the parts of the body between the ribs of the skeleton former.

To enable others skilled in the art to make and use my invention, I will proceed to describe its construction and operation.

A is an upright frame, on the top of which is a stationary horizontal-plate or table, B, having a central circular opening, $a$, under and partly within which is situated the skeleton former C, made of wood or other suitable material. This former C has its vertical profile of conical or other form corresponding with that of the hat-body before the stretching operation, and a portion of it, at about the middle of its height, is of complete circular form in its horizontal section, as shown at $b\,b$ in both figures, but above and below this portion it has a number of vertical recesses, $c\,c'$, between which are left a corresponding number of equidistant radial ribs $d\,d$ and $e\,e$, the ribs $e\,e$ being above and those $d\,d$ below the circular portion $b\,b$, and the edges of these ribs form the profile of the former. The former thus constructed is secured firmly and concentrically upon the upper end of a vertical spindle, J, which is arranged to slide up and down in guides $f\,f$ in the center of the frame concentric with the opening $a$ in the table B, and which has applied to it a lever or treadle, D, by which it can be lifted up to raise the former.

E is a metal ring, having its interior of such size and form as to fit the circular portion $b$ of the former between the upper and lower ribs, $e\,e$ and $d\,d$. This ring is attached by vertical rods $g\,g$ to and below a head-piece, F, of such weight as to be capable of producing the requisite degree of pressure upon a hat-body placed upon the former. In Fig. 1 a body is exhibited upon the former in section in red color. The rods work through guides in a stationary horizontal plate, G, which is supported by vertical pillars $h\,h$ upon the table B, and the ring E is thereby kept concentric with the former. The said ring is supported, when not supported by the former, by means of a vertical screw, H, which screws through a tapped hole in the head-piece F, and the lower end of which, bearing upon the plate G, prevents the ring F from descending below the position in which it is represented in Fig. 1.

K K are a series of thin, round-edged rollers, corresponding in number with the upper recesses $c'$, and ribs $e$ of the former C, arranged above the opening $b$ in the plate or table B, radial to the axis of the former and pressure-ring E, and opposite the centers of the said recesses $c'$. The axles $k\,k$ of these rollers are supported in hangers L L, which are secured by screws $j\,j$ to the plate G, the said screws passing through radial slots in the said plate to enable them to be adjusted toward and from the axis of the former.

M M are a series of thin, rounded edged rollers, corresponding in number with the lower recesses, $c$ and ribs $d$ of the former C, arranged below the plate or table B, radial to the axis of the former and pressure-ring E, and opposite the centers of the said recesses $c$. The axles $m\,m$ of these rollers are supported in hangers N N, which are secured by screws $n$ $n$ to the plate or table B, the said screws passing through radial slots in the said plate or table to permit them to be adjusted toward and from the axis of the former.

The pressure ring E is so adjusted by the screw H, and the rollers K and M are so adjusted by setting the hangers L N, that when a hat-body upon the former is in contact with the said ring while the screw H rests upon the plate G the edges of the rollers K and M are a short distance outside of the profile of the former, as shown in Fig. 1.

The operation of stretching a hat-body in this machine is as follows: The former C is first allowed to descend to such a position as to permit the hat-body to be put on and drawn tightly over it, and when the body is put on the former is raised up by depressing the outer end of the treadle or lever D. When the body comes in contact with the pressure-ring E, the weight of the said ring and the attached head-piece F cause the said ring to hold it with sufficient firmness against the circular portion $b$ of the former to prevent it from slipping between the ring and former, and the continued upward movement of the former produced by a suitable pressure upon the outer end of the leaver or treadle brings the body into contact with the rollers K and M, which are thus made to press the portions of the body between the said rollers and the corresponding ribs of the former into the recesses $c$ and $c'$, the said portions are thereby stretched over the ribs $d$ and $e$. By this means the body is brought to a suitable shape for blocking, and thereby forming the crown and brim of the hat.

Fixed round-edged surfaces may be substituted for and would be the equivalents of the rollers K and M; but I prefer to use the rollers, as by preventing friction upon the hat-body they prevent it from being torn in the stretching operation.

What I claim as my invention, and desire to secure by Letters Patent, is—

1. The employment, in the process of stretching hats, of a skeleton or ribbed and recessed former, substantially such as is herein described.

2. The pressing-ring E, in combination with the skeleton or ribbed and recessed former, substantially as and for the purpose herein specified.

3. The employment, substantially as herein described, in combination with the skeleton or ribbed and recessed former, of pressing-rollers K M, or other equivalent pressing devices, operating as herein set forth.

4. The combination, in a machine for stretching hats, of a skeleton or ribbed and recessed former, a pressing-ring, and a system of rollers or other equivalent pressing devices, the whole combined and operating substantially as and for the purpose herein specified.

R. EICKEMEYER.

Witnesses:
HENRY T. BROWN,
J. W. COOMBS.